United States Patent [19]

Klaes et al.

[11] Patent Number: 5,227,965
[45] Date of Patent: Jul. 13, 1993

[54] FAST PROGRAMMABLE LIMIT SWITCH

[75] Inventors: Carl D. Klaes, Dearborn Heights; Anthony A. Slominski, Roseville, both of Mich.

[73] Assignee: Magnetek Controls, Clawson, Mich.

[21] Appl. No.: 665,566

[22] Filed: Mar. 6, 1991

[51] Int. Cl.⁵ .............................................. G05B 19/18
[52] U.S. Cl. .................. 364/142; 364/167.01
[58] Field of Search .................. 364/167.01, 474.28, 364/474.35, 474.34, 142; 318/562, 600, 601, 602, 603, 572, 568.22

[56] References Cited

U.S. PATENT DOCUMENTS

| | | | |
|---|---|---|---|
| 3,167,002 | 1/1965 | Kaneda et al. | 101/93 |
| 4,037,216 | 7/1977 | Chang et al. | 364/900 |
| 4,096,579 | 6/1978 | Black et al. | 364/900 |
| 4,149,235 | 4/1979 | Froyd et al. | 364/101 |
| 4,218,754 | 8/1980 | Schaeffer | 364/900 |
| 4,510,565 | 4/1985 | Dummermuth | 364/136 |
| 4,578,749 | 3/1986 | Kuno et al. | 364/167.01 |
| 4,744,022 | 5/1988 | Kumar et al. | 364/142 |
| 4,835,676 | 5/1989 | Kumar et al. | 364/142 |
| 4,839,789 | 6/1989 | Kumar et al. | 364/142 |
| 5,014,183 | 5/1991 | Carpenter et al. | 364/167.01 |

Primary Examiner—Jerry Smith
Assistant Examiner—Jim Trammell
Attorney, Agent, or Firm—Krass & Young

[57] ABSTRACT

A programmable limit switch employs high speed special purpose hardware and a general purpose microcontroller to achieve high speed limit switch operation. A state sequencer controls the high speed special purpose hardware in a fixed sequence. The state sequencer latches position data, and recalls position offsets from a memory. A hardware digital adder sums the position and offset with this summed offset position used as an address in output tables for selecting an output status word. The microcontroller operates asynchronously with respect to the state sequencer. The microcontroller initializes and updates the memories. The microcontroller calculates the velocity from repetitive position signals and writes the corresponding window offsets to memory. A selection circuit picks out the status bit of the particular output circuit. Thus unique ON/OFF offsets can be used for each circuit. The outputs are shifted together and latched to the output drivers. By this method the output update time is dependent on the rate of the state sequencer. Using fast logic the update time is greatly reduced over a software only implementation even by very fast microcontrollers.

35 Claims, 2 Drawing Sheets

FIG - 2

DATA IN

LATCH

AND / OR

ENABLE / DISABLE

DATA OUT 13, 21, 22, 23, 24, 25, 26, 27, 28

FIG - 3

```
degrees     0              180 200 220 250     300        350
                            |   |   |   |       |          |
a) position  0000000000000000000000000001111100000 0
b) pos + on  0000000000000000000000011111000000000 0
c) pos + off 0000000000000000000001111100000000000 0
d) b AND c   0000000000000000000000011100000000000 0
```

FIG - 4

```
degrees     0              180 200 220 250     300        350
                            |   |   |   |       |          |
a) position  0000000000000000000000000001111100000 0
b) pos + on  0000000000000000000000111100000000000 0
c) pos + off 0000000000000000000000001111100000000 0
d) b OR c    0000000000000000000000111111100000000 0
```

FAST PROGRAMMABLE LIMIT SWITCH

TECHNICAL FIELD OF THE INVENTION

The technical field of the present invention is that of ON/OFF controllers and particularly such controllers that respond to position signals to control the ON and OFF intervals of a high speed operation.

BACKGROUND OF THE INVENTION

Position transducers can be applied to control the ON/OFF state of external circuits. Such a system monitors position and sets or resets one or more outputs at predefined positions or "setpoints". The mechanisms controlled by this system usually have a constant delay from activation to the desired mechanical reaction. An offset can be added to the transducer position in order to activate the output circuit before its actual setpoint has been reached to compensate for this mechanical delay. As the velocity of the mechanical system increases, the time added by such a positional offset decreases. Therefore, a larger positional offset is needed to compensate for the same mechanical delay at higher speeds. In many mechanical systems the delay for mechanism activation is different from the delay for deactivation of the mechanism. This requires two different positional offsets for delay compensation. When the circuit is OFF an ON offset is used, and when the circuit is in ON an OFF offset is needed.

Usually such a system is implemented in software by a microcontroller. The microcontroller reads the transducer position at fixed time intervals and calculates velocity. The microcontroller computes the offsets based on the calculated velocity and adds these offsets to the position. The microcontroller compares this offset position to a table of ON/OFF positions. The table entry specifies the desired output state. The microcontroller can control many circuits from one position reading.

This programmable microcontroller technique cannot operate at high speeds or with many simultaneously controlled circuits. As an example, consider a system controlling 16 circuits. Reading a 14 bit resolver at 1 rpm requires about 3.7 milliseconds per position. This allows about 230 microseconds per circuit for the 16 circuits being set for each position reading to do the operations listed above. Reading the same 14 bit resolver at 730 rpm requires 5 microseconds per position and leaves only about 310 nanoseconds per circuit for each of the 16 circuits. Reaching this speed with a general purpose computer is very difficult. Each loop requires an estimated 150 computer instructions. If the computer instructions require an average of 10 clock cycles, then a clock cycle rate of more than 4.8 billion per second is required. No readily available a general purpose computer is capable of achieving this rate. Computer hardware especially designed to be this fast is very expensive.

Therefore there is a need for application specific hardware to interface with the microcontroller to jointly implement the required operations at these speeds.

SUMMARY OF THE INVENTION

The present invention employs high speed special purpose hardware and a general purpose microcontroller to achieve high speed limit switch operation. A state sequencer having a fixed sequence controls the high speed special purpose hardware. The microcontroller operates asynchronously with respect to the state sequencer. The microcontroller initializes and updates memories employed by the high speed special purpose hardware in the control operation.

The microcontroller repetitively reads the transducer position through a dual port random access memory, calculates the velocity and writes the corresponding ON and OFF window offsets back to the dual port random access memory. The microcontroller also writes a table of output states based upon set points to a fast static random access memory. These functions are not critical for fast output update since the mechanical velocity changes relatively slowly and the set points are initialization data.

The state sequencer begins by latching the output of the position transducer. Then, the state sequencer addresses the ON or OFF offsets for each controlled circuit. A hardware digital adder then sums the position and offset signals. This summed offset position is used as an address in the output tables, selecting an output status word. A selection circuit picks out the status bit of the particular output circuit. Thus unique ON/OFF offsets can be used for each circuit. The outputs are shifted together and latched to the output drivers. By this method the output update time is not limited by the microcontroller speed. The output update time is dependent on the oscillator frequency of the state sequencer. Using fast logic the update time is greatly reduced over software implementation even by very fast microcontrollers.

BRIEF DESCRIPTION OF THE DRAWINGS

These and other objects and aspects of the present invention will become clear from the following description of the invention, in which:

FIG. 2 illustrates the equivalent internal structure of a programmable logic device illustrated in FIG. 1;

FIG. 3 illustrates the timing of a closing window operation; and

FIG. 4 illustrates the timing of an opening window operation.

DETAILED DESCRIPTION OF THE PREFERRED EMBODIMENTS

Figure 1:
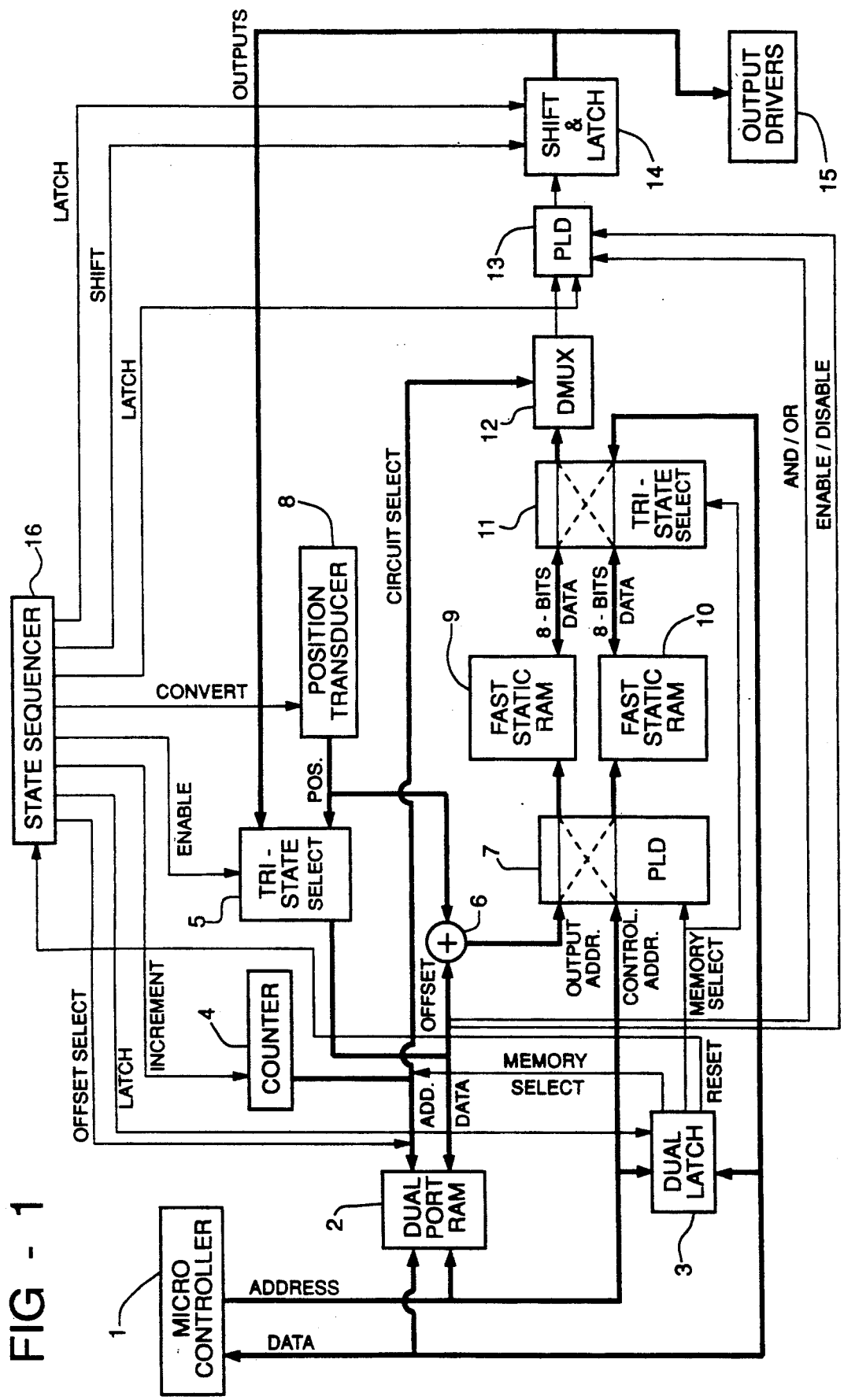
FIG. 1 illustrates in block diagram form the programmable limit switch of the present invention.

FIG. 1 illustrates the fast programmable limit switch of this invention in block diagram form. Microcontroller 1 controls the operation of the fast programmable limit switch. Microcontroller 1 initializes the system and controls processes that are not speed critical. State sequencer 16 operates special purpose hardware that receives the position data, selects and adds the offset and provides output signals to the controlled switches. State sequencer 16 thus controls the speed critical portions of the process.

This invention will be described in an example of a controller for a 16 head glue gun machine used for sealing packages. The 16 glue guns operate in a predetermined phase relationship from a single prime mover. Thus a single position transducer produces the data necessary for the ON and OFF control of all 16 glue guns. Those skilled in the art would realize from this example that this invention can be applied to similar control processes.

Microcontroller 1 initializes the system. Dual port random access memory 2 and fast static random access memories 9 and 10 require initial data for operation. Dual port random access memory 2 separately stores the ON and OFF position offset values for each of the 16 controlled glue guns. As mentioned above, these offset values are dependant upon speed of operation. Microcontroller 1 also creates an output pattern in one of the fast static random access memories 9 or 10 from a group of user entered setpoints. This output pattern corresponds to the respective ON and OFF states for particular sensed positions. The data stored in dual port random access memory 2 and fast static random access memories 9 or 10 are loaded and updated by microcontroller 1 in a manner further described below.

The state sequencer 16 controls the operation of the special purpose hardware of this invention. State sequencer includes a 10 MHz clock driving a counter. This counter addresses a bipolar registered programmable read only memory. Data recalled from this bipolar registered programmable read only memory drive the various state lines of state sequencer 16, which control the various hardware operations. One of the sequencer lines is decoded to reset the counter when the sequence is complete.

The sequence begins by activation of the convert line coupled to position transducer 8. This causes position transducer 8 to generate a position signal. The position transducer 8 can be any number of devices such as a resolver, encoder or linear transducer. In this example, the position transducer produces a digital output or has its output converted to digital form. In this example, the position transducer 8 generates a 14 bit output value corresponding to the position of the controlled machine within a repetitive cycle.

The ON offset is read from dual port random access memory 2 and supplied to the hardware adder 6. The address is set by a combination of a four bit circuit counter 4, an offset select line from state sequencer 16 and a memory select line from the dual latch 3. Four bit circuit counter 4 holds the circuit number. The offset select line from sequencer 16 selects either the ON or OFF offset for the particular circuit. The memory select line from dual latch 3 arbitrates between two areas of dual port random access memory 2. This permits microcontroller 1 to read from or write to one area of dual port random access memory 2 while state sequencer 16 controls the reading from the other area of dual port random access memory 2. Since microcontroller 1 controls dual latch 3, it can prevent conflicts for access to dual port random access memory 2. Dual port random access memory 2 preferably stores 16 bit words. The ON and OFF offsets are preferably 14 bits like the position signal. The two remaining bits are employed to select And/Or processing at programmable logic device 13 and to Enable/Disable programmable logic device 13. Hardware adder 6 adds the recalled offset to the current position data from position transducer 8. Using four 74F283's the 14 bit addition takes roughly 40 nanoseconds.

This sum is used as the address to the output tables of the fast static random access memories 9 and 10. Upon initialization at least one of fast static random access memories 9 and 10 includes output state data corresponding to sensed position. The sum includes the position signal from position transducer 8 and the corresponding offset. Programmable logic device 7 supplies the sum to the address input of one of fast static memories 9 and 10. A second memory select output from dual latch 3 selects the memory. The selected one of fast static random access memories 9 and 10 then outputs a data word containing the circuit output state.

Tri-state select device 11 routes this output data word to demultiplexer 12. The second memory select output of dual latch 3 controls tri-state select device 11 in the same fashion as programmable logic device 7. This memory select output controls programmable logic device 7 and tri-state select device 11 to insure that the data selected by the address from hardware adder 6 is supplied to demultiplexer 12. The data bit for the particular circuit is selected by the demultiplexer 12 using the address provided by circuit counter 4. This data bit is then latched into a flip-flop 21 of programmable logic device 13 as controlled by a latch signal from state sequencer 16. The internal circuits of programmable logic device 13 will be further described below in conjunction with FIG. 2.

This cycle is repeated for the same circuit with the OFF offset. State sequencer 16 changes the offset select line from selecting the ON offset to selecting the OFF offset. This provides a different address into dual port random access memory 2. Other portions of the address, which are specified by circuit counter 4 and dual latch 3, are unchanged. Hardware adder 6 adds this OFF offset position recalled from dual port random access memory 2 to the unchanged position signal from position transducer 8. The sum address an output state stored within the selected fast static random access memory 9 or 10. Tri-state select device 11 routes this output data word to demultiplexer 12, which selects the data bit for the particular circuit.

FIG. 2 illustrates the equivalent logic circuits included within programmable logic circuit 13. The data bit from the ON offset position stored in flip flop 21 and the data bit from the OFF offset position are logically combined. The And/Or bit from the offset recalled from dual port random access memory 2 selects the output of OR gate 22 or AND gate 23. Invertor 24 causes only one of AND gates 25 or 26 to be open. The output of AND gates 25 and 26 are combined in OR gate 27. The output of OR gate 27 is further combined with the Enable/Disable bit from the offset recalled from dual port random access memory 2 in AND gate 28. If enabled via the Enable/Disable signal, the combined value from the gate selected by the AND/OR signal is output. If disabled via the Enable/Disable signal, data corresponding to the OFF state is output. In either case this data is shifted into a 16 bit shift register within shift and latch circuit 14 as controlled by a shift signal from state sequencer 16.

These extra bits of the recalled offset permit greater flexibility in operation. The provision of an AND/OR bit in the recalled offset permits selection of either an AND or an OR window for each circuit. The Enable/Disable bit permits selective disabling of one or more of the controlled circuits, such as when a particular glue gun is not in use. Since these bits are part of the offset data stored in dual port random access memory 2, these features are under control of microcontroller 1. Note that the And/Or bit and the Enable/Disable bit may be stored in the ON offset or the OFF offset or both as selected by the designer.

The process of recall and combination of the ON and OFF offset data is repeated for each of the remaining circuits. Circuit counter 4 increments its count in response to a signal from state sequencer 16 on the increment line. This causes the address supplied to dual port random access memory 2 to refer to the next circuit This also causes demultiplexer 12 to select the data bit corresponding to this next circuit. The output data bits are combined in the manner previously described. Programmable logic device 13 selects the output of either OR gate 22 or AND gate 23 for application to shift and latch circuit 14 based upon the And/Or bit of the recalled offset. In response to a shift signal from state sequencer 16, shift and latch circuit 14 shifts the new data bit into the shift register and shifts the prior data bits along one position. This same process repeats for each of the 16 circuits.

The apparatus thus calculates the output state of all 16 circuits. The contents of the shift register in shift and latch circuit 14 now correspond to the proper output state for the 16 circuits. In response to a latch signal from state sequencer 16, shift and latch circuit 14 latches this set of states to the output drivers 15. This new data remains valid until completion of the next set of state computations.

Several additional steps are required to complete a cycle. State sequencer 16 permits the position signal from position transducer 8 and the output states of shift and latch circuit 14 to be stored in dual port random access memory 2. State sequencer 16 controls tri-state select device 5 to sequentially supply the position signal and the output signal to dual port random access memory 2 for storage. In each case the address where this data is stored is specified by counter 4. State sequencer 16 sends a latch signal to dual latch 3. This permits the memory select outputs of dual latch 3 to change. Regardless of the inputs to dual latch 3 from microcontroller 1, the memory select outputs can only change between update cycles. Thus switching memory areas within dual port random access memory or switching between fast static random access memories 9 and 10 cannot interrupt an update cycle. Finally, state sequencer 16 must reset circuit counter 4. This constitutes one output update cycle.

Programmable logic device 13 selects two types of windowing operations depending on the state of the And/Or bit of the recalled offset. Selecting AND gate 26 selects a closing window operation. Selecting OR gate 25 selects an opening window operation. FIGS. 3 and 4 illustrate examples of these windowing operations. These examples show the position of the apparatus sensed by position transducer 8 as divided into thirty six 10 degree segments, for a total of 360 degrees. This should be understood as illustrative only. Any practical device would determine position to much greater precision.

FIG. 3 illustrates an example of closing window operation. The desired ON and OFF set positions are shown in FIG. 3a). In this example, the circuit is programmed to turn ON (1's) at 250 degrees and to turn OFF (0's) at 300 degrees. In this example, the apparatus velocity is such that the apparatus requires 50 degrees of lead to turn ON and 70 degrees of lead to turn OFF. FIG. 3b) shows the ON offset set adding 50 degrees of positional offset. In FIG. 3b) the output turns ON at 200 degrees and turns OFF at 250 degrees. Similarly, FIG. 3c) shows the OFF offset set adding 70 degrees of positional offset. FIG. 3c) shows the output turning ON at 180 degrees and turning OFF at 230 degrees.

In closing window operation programmable logic device 13 selects the output of AND gate 26. FIG. 3d) shows the actual output pattern formed by AND'ing the ON offset signal of FIG. 3b) and the OFF offset signal of FIG. 3c). The circuit turns ON at the leading edge of FIG. 3b) and OFF at the trailing edge of FIG. 3c). Thus the resultant output turns ON at 200 degrees, which is 50 degrees before the desired ON location of 250 degrees, and turns OFF at 230 degrees, which is 70 degrees before the desired OFF location of 300 degrees. Selection of closing window operation at programmable logic device 13 via the And/Or bit is appropriate as long as the ON offset is greater than or equal to the OFF offset. Microcontroller 1 is preferably programmed to automatically select a closing window operation via the And/Or bit of the offset if this is the case.

FIG. 4 illustrates an example of opening window operation. The desired ON and OFF set positions are shown in FIG. 4a). These are the same as illustrated in FIG. 4a). In this example, the apparatus velocity is such that the apparatus requires 70 degrees of lead to turn ON and only 50 degrees of lead to turn OFF. FIG. 4b) shows the ON offset output including 70 degrees of positional offset. In FIG. 4b) the output turns ON at 180 degrees and turns OFF at 230 degrees. FIG. 4c) shows the OFF offset including 50 degrees of positional offset, turning ON at 200 degrees and turning OFF at 250 degrees.

Selecting OR gate 25 via programmable logic device 13 selects an opening window operation. FIG. 4d) shows the output turning ON at 180 degrees, 70 degrees before the desired ON operation, and turning OFF at 250 degrees, 50 degrees before the desired OFF operation. Selection of opening window operation is appropriate as long as the ON offset is greater than or equal to the OFF offset. Microcontroller 1 is preferably programmed to automatically select an opening window operation via the And/Or bit of the offset if this is the case.

The closing and opening windows permit proper operation of the controlled device based upon the relative ON and OFF offsets. The controlled device always turns ON at the beginning of the ON offset and turns OFF at the end of the OFF offset. Rather than determine the two edges, the present invention selects one of OR gate 25 or AND gate 26 depending on the relative lengths of ON offset and the OFF offset. This technique provides greater flexibility than merely loading fast static random access memories 9 and 10 with the resultant output. Providing the window type selection in the offset stored in dual port random access memory 2 permits differing ON and OFF offsets to be specified for each circuit controlled.

The microcontroller 1 shown in FIG. 1 is separate from the special purpose high speed hardware. Virtually any microcontroller system could be used to embody microcontroller 1. In this particular example, microcontroller 1 is a 6502. The speed of operation of the microcontroller is not critical, because the special purpose high speed hardware updates the output states based upon position independent of the operation of the microcontroller.

As previously described, microcontroller 1 initializes dual port random access memory 2. Microcontroller 1 stores velocity based ON and OFF offsets corresponding to the estimated initial velocity in dual port random access memory 2. This provides state sequencer 16 access to the ON and OFF offsets needed in the control process.

Dual port random access memory 2 includes two ports to permit independent access via microcontroller 1 and via state sequencer 16. To facilitate this process, dual random access memory 2 is constructed in two sections. One section, as selected by a memory select output from dual latch 3, is employed for recall of the offsets used in device control under the control of state sequencer 16. The offset recall, which is time critical, is thus always available. Microcontroller 1 has access to the other section of dual port random access memory 2, and may switch sections by changing the data at dual latch 3. This switching of sections of dual port random access memory 2 can take place only at the end of a cycle of state sequencer 16. Note that this process prevents conflicts in accessing dual port random access memory 2.

The microcontroller 1 reads the transducer position 8 through the dual port random access memory 2. Microcontroller 1 calculates the velocity based on periodic reads of this position data from position transducer 8 stored in dual port random access memory 2. This permits calculation of velocity based ON and OFF offsets for each of the 16 circuits. As previously described, position data from position transducer 8 is written into one section of dual port random access memory 2. Microcontroller 1 gains access to this position data by periodically switching sections of dual port random access memory 2 via dual latch 3.

Microcontroller 1 computes new velocity based ON and OFF offsets upon detection of a change in velocity. These newly calculated ON and OFF offsets are then stored in the section of dual port random access memory 2 not selected by dual latch 3. Once these new offsets are written into dual port random access memory 2, microcontroller 1 writes into dual latch 3 to change the memory section available to the high speed control process. State sequencer 16 permits this change to become effective by sending the latch signal to dual latch 3 at the end of a cycle.

Microcontroller 1 also initializes fast static random access memories 9 and 10. Microcontroller 1 creates an output pattern in one of the fast static random access memories 9 or 10 from a group of user entered setpoints. Before initial use of the programmable limit switch, microcontroller 1 writes data into dual latch 3 to permit state sequencer 16 to access the one of the fast static random access memories 9 or 10 storing the desired output pattern. The memory select signal from dual latch 3 causes programmable logic device 7 to direct the output from hardware adder 6 to the selected memory. This memory select signal from dual latch 3 also causes tri-state select device 11 to route the data output from the selected memory to demultiplexer 12.

This memory select signal from dual latch 3 permits microcontroller 1 to access the other of the fast static random access memories 9 and 10. Programmable logic device 7 supplies the address from microcontroller 1 to the other memory. Tri-state selection device 11 also couples the data lines of this other memory to the data bus of microcontroller 1. Thus microcontroller 1 has read and write access to this other memory. Upon completion of a new output pattern, microcontroller 1 writes to the latch of dual latch 3 which supplies the memory select signal to programmable logic device 7 and tri-state select device 11. State sequencer 16 permits this change in state to become effective at the end of a cycle through the latch signal supplied to dual latch 3. This new memory select signal reverses the roles of fast static memories 9 and 10.

We claim:

1. A programmable controller for controlling an output state during a repetitive operation cycle comprising:
   a cycle position transducer for generating a digital position signal indicative of the position within the repetitive operation cycle;
   an offset memory connected to said cycle position transducer for storing therein a plurality of digital offset signals, each digital offset signal indicative of an offset distance corresponding to a unique position within the repetitive operation cycle, said offset memory recalling one of said digital offset signals in response to said digital position signal;
   a digital adder connected to said cycle position transducer and said offset memory for adding said digital position signal and said recalled digital offset signal thus generating a sum position signal;
   an output state memory connected to said digital adder having a plurality of address locations, each address location storing therein an output state signal corresponding to a desired output state for a unique position within the repetitive operation cycle, said output state memory recalling said output state signal stored in an address location indicated by said sum position signal; and
   an output driver connected to said output state memory for producing an output state corresponding to said recalled output state signal.

2. The programmable controller as claimed in claim 1, wherein:
   said offset memory is alterable permitting alteration of said each of said plurality digital offset signals stored therein to indicate differing offset distances within the repetitive operation cycle.

3. The programmable controller as claimed in claim 2, wherein:
   said offset memory includes
      a first offset memory section storing therein a first set of a plurality of digital offset signals,
      a second offset memory section storing therein a second set of a plurality of digital offset signals,
      a multiplexer connected to said first and second offset memory sections selectively operative for either
         recalling a digital offset signal of said first set of digital offset signals from said first offset memory section in response to said digital position signal, or
         recalling a digital offset signal of said second set of digital offset signals from said second offset memory section in response to said digital position signal.

4. The programmable controller as claimed in claim 2, further comprising:
   an offset determination means connected to said cycle position transducer and said offset memory for altering said plurality of digital offset signals inversely proportional to the rate of change of said digital position signal.

5. The programmable controller as claimed in claim 1, wherein:
   said output state memory is alterable permitting alteration of said output state signal stored in each of said plurality of address locations to differing output state signals corresponding to said unique position within the repetitive operation cycle.

6. The programmable controller as claimed in claim 5, further comprising
    an output state determination means connected to said output state memory for selecting an output state for each position within the repetitive operation cycle; and
    said output state memory includes
        a first output state memory section having a plurality of first address locations, each first address location storing therein an indication of a first output state corresponding to a unique position within the repetitive operation cycle,
        a second output state memory section having a plurality of second address locations, each second address location storing therein an indication of a second output state corresponding to a unique position within the repetitive operation cycle,
        a multiplexer connected to said digital adder, said first and second output state memory sections and said output state determination means for selecting either
            applying said sum position signal to said first output state memory section for recalling a first output state corresponding to said sum position signal and coupling said output state determination means to said second output state memory section permitting writing said determined output states within said respective second address locations, or
            applying said sum position signal to said second output state memory section for recalling a second output state corresponding to said sum position signal and coupling said output state determination means to said first output state memory section permitting writing said determined output states within said respective first address locations.

7. The programmable controller as claimed in claim 1, wherein:
    said output states stored within said output state memory consist of an ON output state and an OFF output state, and each address location within said output state memory stores a single bit of data.

8. The programmable controller as claimed in claim 7, wherein:
    said offset memory includes
        an ON offset memory section for storing therein a digital ON offset signal corresponding to an offset distance for transition from the OFF to the ON output state within the repetitive operation cycle, and
        an OFF offset memory section for storing therein a digital OFF offset signal corresponding to an offset distance for transition from the ON to the OFF output state within the repetitive operation cycle;
    said programmable controller further comprising a state sequencer connected to said offset memory operative to recall said ON offset signal from said ON offset memory section and recall said OFF offset signal from said OFF offset memory section in a predetermined order;
    said output driver including a combination means for combining for each controlled output state said output state signal stored in said address location indicated by the sum of said ON offset signal and said digital position signal and said output state signal stored in said address location indicated by the sum of said OFF offset signal and said digital position signal.

9. The programmable controller as claimed in claim 8, wherein:
    said combination means includes an AND circuit for forming for each controlled output state the logical AND of said output state signal stored in said address location indicated by said the sum of said ON offset signal and said digital position signal and said output state signal stored in said address location indicated by the sum of said OFF offset signal and said digital position signal.

10. The programmable controller as claimed in claim 8, wherein:
    said combination means includes an OR circuit for forming for each controlled output state the logical OR of said output state signal stored in said address location indicated by said the sum of said ON offset signal and said digital position signal and said output state signal stored in said address location indicated by the sum of said OFF offset signal and said digital position signal.

11. The programmable controller as claimed in claim 8, wherein:
    said combination means includes
        an AND circuit for forming for each controlled output state the logical AND of said output state signal stored in said address location indicated by said the sum of said ON offset signal and said digital position signal and said output state signal stored in said address location indicated by the sum of said OFF offset signal and said digital position signal,
        an OR circuit for forming for each controlled output state the logical OR of said output state signal stored in said address location indicated by said the sum of said ON offset signal and said digital position signal and said output state signal stored in said address location indicated by the sum of said OFF offset signal and said digital position signal, and
        a selection circuit for selectively producing an output state corresponding to either the output of said AND circuit or the output of said OR circuit.

12. The programmable controller as claimed in claim 11, wherein:
    said offset memory further stores an And/Or selection signal corresponding to at least one of said ON offset signal or said OFF offset signal for each of said plurality of controlled output states, said And-/Or selection signal indicating selection of either said AND circuit or said OR circuit by said selection circuit; and
    said selection circuit is further connected to said offset memory for producing an output state corresponding to the output of said AND circuit upon recall of an And/Or selection signal indicating selection of said AND circuit and for producing an output state corresponding to the output of said OR circuit upon recall of an And/Or selection signal indicating selection of said OR circuit.

13. A programmable controller for controlling a plurality of output states during a repetitive operation cycle comprising:

a cycle position transducer for generating a digital position signal indicative of the position within the repetitive operation cycle;

an offset memory connected to said cycle position transducer for storing therein a plurality of digital offset signals for each of the plurality of controlled output states, each digital offset signal indicative of an offset distance corresponding to a unique position within the repetitive operation cycle;

a state sequencer connected to said offset memory operative to recall said digital offset signals for each of the plurality of controlled output states from said offset memory repetitively in a predetermined order;

a digital adder connected to said cycle position transducer and said offset memory for adding said digital position signal and said recalled digital offset signal thus generating a sum position signal;

an output state memory connected to said digital adder having a plurality of address locations, each address location storing therein an output state signal corresponding to a desired output state for a unique position within the repetitive operation cycle, said output state memory for recalling said output state signal stored in an address location indicated by said sum position signal; and an output driver connected to said output state memory and said state sequencer for producing a plurality of output states, each output state corresponding to said recalled output state signal for one of said sequence of offset values.

14. The programmable controller as claimed in claim 13, wherein:
   said offset memory is alterable permitting alteration of said digital offset signals stored therein corresponding to each controlled output state to indicate differing offset distances within the repetitive operation cycle.

15. The programmable controller as claimed in claim 14, wherein:
   said offset memory includes
      a first offset memory section for storing therein a first set of a plurality of first digital offset signals for each controlled output state,
      a second offset memory section for storing therein a second set of a plurality of second digital offset signals for each controlled output state, and
      a multiplexer connected to said first and second offset memory sections selectively operative for either
         recalling a digital offset signal of said first set of digital offset signals from said first offset memory section in response to said digital position signal, or
         recalling a digital offset signal of said second set of digital offset signals from said second offset memory section in response to said digital position signal.

16. The programmable controller as claimed in claim 14, further comprising
   an offset determination means connected to said cycle position transducer and said offset memory for altering said digital offset signal corresponding to each controlled output state inversely proportional to the rate of change of said digital position signal.

17. The programmable controller as claimed in claim 13, wherein:
   said output state memory is alterable permitting alteration of said output state signal stored in each of said plurality of address locations to differing output state signals corresponding to said unique position within the repetitive operation cycle.

18. The programmable controller as claimed in claim 17, further comprising:
   an output state determination means connected to said output state memory for selecting an output state for each position within the repetitive operation cycle; and
   said output state memory includes
      a first output state memory section having a plurality of first address locations, each first address location storing therein an indication of a first output state corresponding to a unique position within the repetitive operation cycle,
      a second output state memory section having a plurality of second address locations, each second address location storing therein an indication of a second output state corresponding to a unique position within the repetitive operation cycle,
      a multiplexer connected to said digital adder, said first and second output state memory sections and said output state determination means for selecting either
         applying said sum position signal to said first output state memory section for recalling a first output state corresponding to said sum position signal and coupling said output state determination means to said second output state memory section permitting writing said determined output states within said respective second address locations, or
         applying said sum position signal to said second output state memory section for recalling a second output state corresponding to said sum position signal and coupling said output state determination means to said first output state memory section permitting writing said determined output states within said respective first address locations.

19. The programmable controller as claimed in claim 13, wherein:
   said output states stored within said output state memory consist of an ON output state and an OFF output state, and each address location within said output state memory stores a single bit of data.

20. The programmable controller as claimed in claim 19, wherein:
   said offset memory includes
      an ON offset memory section for storing therein a digital ON offset signal for each of the controlled output states corresponding to an offset distance for transition from the OFF to the ON output state within the repetitive operation cycle, and
      an OFF offset memory section for storing therein a digital OFF offset signal for each of the controlled output states corresponding to an offset distance for transition from the ON to the OFF output state within the repetitive operation cycle;
   said state sequencer being further operative to recall said ON offset value from said ON offset memory section for each of the controlled output states and recall said OFF offset value from said OFF offset memory section for each of the controlled output states repetitively in a predetermined order;

said output driver including a combination means for combining said output state signal stored in said address location indicated by the sum of said ON sum offset signal and said digital position signal and said output state signal stored in said address location indicated by the sum of said OFF sum offset signal and said digital position signal for each of the controlled output states.

21. The programmable controller as claimed in claim 20, wherein:

said combination means includes an AND circuit for forming for each controlled output state the logical AND of said output state signal stored in said address location indicated by the sum of said ON offset signal and said digital position signal and said output state signal stored in said address location indicated by the sum of said OFF offset signal and said digital position signal.

22. The programmable controller as claimed in claim 20, wherein:

said combination means includes an OR circuit for forming for each controlled output state the logical OR of said output state signal stored in said address location indicated by the sum of said ON offset signal and said digital position signal and said output state signal stored in said address location indicated by the sum of said OFF offset signal and said digital position signal.

23. The programmable controller as claimed in claim 20, wherein:

said combination means includes an AND circuit for forming for each controlled output state the logical AND of said output state signal stored in said address location indicated by the sum of said ON offset signal and said digital position signal and said output state signal stored in said address location indicated by the sum of said OFF offset signal and said digital position signal, an OR circuit for forming for each controlled output state the logical OR of said output state signal stored in said address location indicated by the sum of said ON offset signal and said digital position signal and said output state signal stored in said address location indicated by the sum of said OFF offset signal and said digital position signal, and a selection circuit for selectively producing an output state corresponding either the output of said AND circuit or the output of said OR circuit.

24. The programmable controller as claimed in claim 23, wherein:

said offset memory further stores an And/Or selection signal corresponding to at least one of said ON offset signal or said OFF offset signal for each of said controlled output states, said And/Or selection signal indicating selection of either said AND circuit or said OR circuit by said selection circuit; and said selection circuit is further connected to said offset memory for producing an output state corresponding to the output of said AND circuit upon recall of an And/Or selection signal indicating selection of said AND circuit and for producing an output state corresponding to the output of said OR circuit upon recall of an And/Or selection signal indicating selection of said OR circuit.

25. The programmable controller as claimed in claim 20, wherein:

said offset memory further stores an Enable/Disable selection signal corresponding to at least one of said ON offset signal or said OFF offset signal for each of said controlled output states, said Enable/Disable signal indicating either selection of an enabled mode or a disabled mode for the corresponding controlled output state; and said combination means is further connected to said offset memory for producing an output state corresponding to the combined output state signal for the corresponding controlled output state upon recall of an Enable/Disable selection signal indicating selection of said enabled mode and for producing an OFF output state for the corresponding controlled output state upon recall of an Enable/Disable selection signal indicating selection of said disabled mode.

26. A programmable controller for controlling a plurality of output states during a repetitive operation cycle comprising:

a cycle position transducer for generating a digital position signal indicative of the position within the repetitive operation cycle;

an offset memory for storing therein separate ON and OFF digital offset signals corresponding to respective offset distances within the repetitive operation cycle for each of the plurality of controlled output states;

a state sequencer connected to said offset memory operative to recall said ON and OFF digital offset signals for each of the plurality of controlled output states from said offset memory repetitively in a predetermined order;

a digital adder connected to said cycle position transducer and said offset memory for adding said digital position signal and a digital offset signal recalled from said offset memory in the sequence controlled by said state sequencer thereby sequentially forming sum position signals;

an output state memory connected to said digital adder having a plurality of address locations, each address location storing therein an output state signal corresponding to a desired output state for a unique position within the repetitive operation cycle, said output state memory for recalling said output state signal stored in an address location indicated by a sum position signal;

a microcontroller unit connected to said offset memory and said output state memory operative to initialize and update said separate ON and OFF digital offset signals for each of the plurality of controlled output states stored in said offset memory, initialize and update said output state signals stored in said output state memory for each of said plurality of address locations;

an output driver connected to said state sequencer and said output state memory for producing a plurality of output states, each output state corresponding to a combination of the output state signals recalled from said output state memory for respective ON and OFF offset signals for the controlled output states in the sequence determined by said state controller.

27. The programmable controller as claimed in claim 26, wherein:
said offset memory includes
a first offset memory section for storing therein a first set of ON and OFF digital offset signals for each controlled output state,
a second offset memory section for storing therein a second set of ON and OFF digital offset signals for each controlled output state,
a latch circuit connected to said first and second offset memory sections and said microcontroller unit, said latch circuit producing under control of said microcontroller unit a memory selection signal operative for either
recalling a digital offset signal of said first set of ON and OFF digital offset signals from said first offset memory section in response to said digital position signal, or
recalling a digital offset signal of said second set of ON and OFF digital offset signals from said second offset memory section in response to said digital position signal.

28. The programmable controller as claimed in claim 27, wherein:
said state sequencer is further connected to said latch circuit and is further operative to supply a latch signal to said latch circuit between repeats of recall of said ON and OFF digital offset signals for said plurality of controlled output states; and
said latch circuit is inhibited from changing said memory selection signal until receipt of said latch signal.

29. The programmable controller as claimed in claim 26, wherein:
said offset memory consists of a dual port memory having
a first port connected to said digital adder for recall of respective ON and OFF digital offset signals stored within one of said first and second offset memory sections as specified by said memory selection signal, and
a second port connected to said microcontroller unit for storage of said ON and OFF digital offset signals therein within the other of said first and second offset memory sections as specified by said memory selection signal at addresses specified by said microcontroller unit.

30. The programmable controller as claimed in claim 29, wherein:
said offset memory further stores an And/Or selection signal corresponding to at least one of said ON offset signal or said OFF offset signal for each of said controlled output states, said And/Or selection signal indicating selection of either said logical AND signal or said logical OR signal by said selection circuit; and
said selection circuit is further connected to said offset memory for producing an output state corresponding to said logical AND signal upon recall of an And/Or selection signal indicating selection of said logical AND signal and for producing an output state corresponding to said logical OR signal upon recall of an And/Or selection signal indicating selection of said logical OR signal.

31. The programmable controller as claimed in claim 29, wherein:
said offset memory further stores an Enable/Disable selection signal corresponding to at least one of said ON offset signal or said OFF offset signal for each of said controlled output states, said Enable/Disable signal indicating either selection of an enabled mode or a disabled mode for the corresponding controlled output state; and
said output driver is further connected to said offset memory for producing an output state corresponding to the combined output state signal for the corresponding controlled output state upon recall of an Enable/Disable selection signal indicating selection of said enabled mode and for producing an OFF output state for the corresponding controlled output state upon recall of an Enable/Disable selection signal indicating selection of said disabled mode.

32. The programmable controller as claimed in claim 26, wherein:
said output state memory includes
a first output state memory section having a plurality of address locations, each address location storing therein an indication of the output state corresponding to a unique position within the repetitive operation cycle, and
a second output state memory section having a plurality of address locations, each address location storing therein an indication of the output state corresponding to a unique position within the repetitive operation cycle; and
said programmable controller further comprises a latch circuit connected to said first and second output state memory sections and said microcontroller unit for producing under control of said microcontroller unit a memory selection signal operative for either
applying said sum position signal to said first output state memory section for recalling a first output state corresponding to said sum position signal and coupling said microcontroller to said second output state memory section permitting writing output states within said respective second address locations, or
applying said sum position signal to said second output state memory section for recalling a second output state corresponding to said sum position signal and coupling said microcontroller to said first output state memory section permitting writing output states within said respective first address locations.

33. The programmable controller as claimed in claim 32, wherein:
said state sequencer is further connected to said latch circuit and is further operative to supply a latch signal to said latch circuit between repeats of recall of said ON and OFF digital offset signals for said plurality of controlled output states; and
said latch circuit is inhibited from changing state until receipt of said latch signal.

34. The programmable controller as claimed in claim 26, wherein:
said output driver includes
a flip flop for storage of the output state corresponding to the first recalled of said ON and OFF digital offset signals for each controlled output state,
an OR gate having a first input connected to said output state memory and a second output connected to said flip flop for forming a logical OR signal of the output states corresponding to said ON and OFF digital offset signals for each controlled output state,
an AND gate having a first input connected to said output state memory and a second output connected to said flip flop for forming a logical AND signal of the output states corresponding to said ON and OFF digital offset signals for each controlled output state,
a selection device connected to said OR gate and said AND gate for selectively producing an output state corresponding to either said logical OR signal or said logical AND signal.

35. The programmable controller as claimed in claim 26, further comprising:
a selection device connected to said position transducer, said offset memory, said state sequencer and said output driver for sequentially supplying said position signal from said position transducer and said plurality of output states from said output driver for storage in said offset memory.

* * * * *